United States Patent [19]

Okufuji

[11] Patent Number: 5,335,415
[45] Date of Patent: Aug. 9, 1994

[54] APPARATUS FOR WINDING AND PRESSURE-FITTING A SMALL WIDTH STRIP TO A ROTATING BODY

[75] Inventor: Yukitaka Okufuji, Tokyo, Japan

[73] Assignee: Bridgestone Corporation, Tokyo, Japan

[21] Appl. No.: 969,563

[22] Filed: Oct. 30, 1992

[30] Foreign Application Priority Data

Oct. 30, 1991 [JP] Japan .................. 3-311993
Oct. 30, 1991 [JP] Japan .................. 3-311994

[51] Int. Cl.$^5$ .................. B23P 19/02; B29D 30/08
[52] U.S. Cl. .................. 29/820; 29/33 S;
29/779; 29/894.2; 156/412; 156/425; 242/413.2
[58] Field of Search ............ 29/33 Q, 33 S, 33 F,
29/34 D, 428, 779, 780, 782, 819, 820, 894.2;
156/405.1, 412, 413, 414, 425, 422; 242/67.1 R,
67.2, 67.5, 68

[56] References Cited

U.S. PATENT DOCUMENTS

| | | | |
|---|---|---|---|
| 4,291,460 | 9/1981 | Stoehr | 29/820 |
| 4,775,433 | 10/1988 | Ishii | 156/425 X |
| 4,812,196 | 3/1989 | Ishii | 156/412 |
| 4,877,477 | 10/1989 | Yabe et al. | 156/425 X |
| 5,175,930 | 1/1993 | Okuyama et al. | 156/413 X |

FOREIGN PATENT DOCUMENTS

| | | |
|---|---|---|
| 60-54841 | 3/1985 | Japan . |
| 6430737 | 2/1989 | Japan . |
| 243028 | 2/1990 | Japan . |
| 288224 | 3/1990 | Japan . |
| 44133 | 1/1992 | Japan . |
| 2031831 | 4/1980 | United Kingdom ........... 29/820 |

Primary Examiner—Peter Dungba Vo
Attorney, Agent, or Firm—Sughrue, Mion, Zinn, Macpeak & Seas

[57] ABSTRACT

An apparatus for winding a belt-like member and a method of feeding a belt-like member for helically winding a belt-like member of a small width around an outer periphery of a rotating body which is rotatable about an axis of rotation and whose radius from the axis of rotation to the outer periphery thereof changes in correspondence with an axial position. A holding device is capable of holding a starting end of the belt-like member from both obverse and reverse surface sides thereof and of pressure-fitting the starting end of the belt-like member onto the rotating body. A feeding device moves the starting end of the belt-like member from a holding position where the belt-like member is held to the rotating body by moving the holding device, so as to feed the belt-like member to the rotating body.

18 Claims, 6 Drawing Sheets

APPARATUS FOR WINDING AND PRESSURE-FITTING A SMALL WIDTH STRIP TO A ROTATING BODY

BACKGROUND OF THE INVENTION

1. Field of the Invention

The present invention relates to an apparatus for winding a belt-like member of a small width helically around an outer periphery of, for instance, a rotating body which is rotatable about an axis of rotation and whose radius from the axis of rotation to its outer periphery changes in correspondence with an axial position. This invention relates as well as to a method of feeding such a belt-like member.

2. Description of the Related Art

As a conventional apparatus for winding a belt-like member or a linear material, is disclosed in, for instance, U.S. Pat. No. 4,775,433 is. The apparatus in the patent comprises: a lead screw extending parallel with an axis of rotation of a toroidal constituent member of a tire; a movable base adapted to threadedly engage with the lead screw and move along the lead screw by the rotation of the lead screw; a rotating block adapted to rotate about a vertical axis by means of a torque actuator disposed on the movable base; a tilting plate having a rail slidably fitted in the rotating block, the tilting plate being adapted to tilt over a base surface by receiving a rotating force from the rotating block; a contour block having a rear surface whose profile is identical to a projected configuration of a crown portion of the tire constituent member, the rear surface being in contact with a front surface of the tilting plate without slipping thereon; a lead screw supported by the tilting plate and extending along the tilting plate; a feed roller which is supported by a moving frame threadedly engaging with the lead screw and is adapted to guide the linear material; and a sensor for measuring a distance between the moving frame and the contour block.

In the case where the belt-like member is wound around the tire constituent member in accordance with the prior art arranged as described above, the tire constituent member is rotated around the axis of rotation. At the same time, the lead screw is rotated, and the feed roller for guiding the linear material is moved along the axis of rotation of the tire constituent member. Consequently, the linear material is helically wound around the outer periphery of the tire constituent member. At this time, since the radius of the tire constituent member changes in correspondence with the axial position, the distance between the moving frame and the contour block exceeds a predetermined value due to the movement of the feed roller. Hence, as a signal is transmitted from the sensor to the lead screw, the lead screw is rotated, which in turn causes the movable base to move along the lead screw. At this time, since a rotational force is imparted from the torque actuator to the tilting plate via the moving block, the tilting plate is inclined until it abuts against the rear surface of the contour block, i.e., until it becomes parallel with a tangent to the outer periphery of the tire constituent member. As a result, the feed roller moves by following the outer periphery of the tire constituent member, and feeds the linear material substantially along a normal line of the tire constituent member.

However, such a conventional apparatus for winding a linear material has drawbacks in that the structure is complicated and the manufacturing cost thereof is high.

In addition, as another apparatus for winding a belt-like member and a method of feeding the same, those disclosed in, for instance, Japanese Patent Application Laid-Open No. 88224/1990 are known. In this technique, after a winding start end of a ribbon for a cap ply is sucked by a suction pad connected to a low-pressure source, a piston rod of a fluid cylinder extends to cause the winding start end of the ribbon to be supplied and pressure-fitted to a belt layer on a belt-forming drum.

With this conventional apparatus for winding a belt-like member and a method of feeding the same, although the winding start end of the ribbon is fed to the drum while being sucked by the suction pad, a maximum sucking force using such a suction pad is restricted to a low level by the atmospheric pressure. Hence, there is a problem in that if an external force or the like acts on the belt-like member while the belt-like member is being supplied, the belt-like member deviates from or, in some cases is, removed from the suction pad.

SUMMARY OF THE INVENTION

In view of the above-described circumstances, it is an object of the present invention to provide an apparatus for winding a belt-like member and a method of feeding a belt-like member in which the structure is simple and can be manufactured at low cost. It is further object of this invention to make it possible to feed a starting end of the belt-like member reliably and with high accuracy to a body to which the belt-like member is supplied, e.g., a rotating body.

To this end, in accordance with one aspect of the invention, there is provided an apparatus for winding a belt-like member for feeding a starting end of a belt-like member of a small width to a rotating body and for pressure-fitting the same onto the rotating body, the apparatus comprising: a holding device capable of holding the starting end of the belt-like member from both obverse and reverse surface sides thereof and of pressure-fitting the starting end of the belt-like member onto the rotating body; and a feeding device for feeding the starting end of the belt-like member to the rotating body by moving the starting end of the belt-like member from a holding position where the belt-like member is held to the rotating body as the holding device is moved.

In accordance with the above-described aspect of the invention, the starting end of the belt-like member located at the holding position is held from both obverse and reverse surface sides thereof by the holding device. Then, as the holding device is moved by the feeding device, the starting end of the belt-like member is fed from the holding position to the rotating body. During feeding, the starting end of the belt-like member is held from both obverse and reverse surface sides thereof by the holding device, but since such a holding force is a mechanical force, the holding force can be made substantially large, as required. Consequently, even if a large external force or the like acts on the belt-like member during feeding, the belt-like member is prevented from being offset or removed from the holding device, so that the starting end of the belt-like member can be fed to the rotating body reliably and with high accuracy. When the starting end of the belt-like member reaches the rotating body, the starting end of the belt-like member is pressured-fitted to the rotating body by the holding device.

In accordance with another aspect of the invention, there is provided an apparatus for helically winding a belt-like member of a small width around an outer periphery of a rotating body which is rotatable about an axis of rotation and whose radius from the axis of rotation to the outer periphery thereof changes in correspondence with an axial position, the apparatus comprising: a guiding device for guiding the belt-like member being supplied to the rotating body; a moving device for moving the guiding device in parallel with an axial direction of the rotating body; an approaching device for moving the guiding device toward or away from the rotating body by moving the guiding device in parallel with a straight line perpendicular to the axis of rotation of the rotating body; a rotating device for rotating the guiding device about a straight line substantially parallel with a tangent to the outer periphery of the rotating body; and a control device adapted to change a position of the guiding device by following an outer profile of the rotating body by controlling the moving device and the approaching device, and to cause obverse and reverse surfaces of the belt-like member at a winding position to be perpendicular to a normal line to the outer periphery of the rotating body at the winding position by controlling the rotating device.

In accordance with the above-described aspect of the invention, when the belt-like member is wound helically around the outer periphery of the rotating body, the rotating body is rotated, and the belt-like member guided by the guiding device is fed to the rotating body. Concurrently, the moving device is actuated to move the guiding device in parallel with the axis of rotation of the rotating body. As a result, the belt-like member is wound helically around the outer periphery of the rotating body. Here, since the radius of the rotating body changes in correspondence with the axial position, if the guiding device is merely moved in parallel with the axis of rotation of the rotating body, there is the possibility that the guiding device is excessively removed from or made close to the outer periphery of the rotating body. For this reason, in this invention, the approaching device is concurrently actuated to move the guiding device in parallel with a straight line perpendicular to the axis of rotation of the rotating body, to move the guiding device toward or away from the rotating body. The movement of the guiding device by the approaching device is effected on the basis of information concerning the outer profile of the rotating body stored in advance in the control device. As a result, the relative position of the guiding device vis-a-vis the outer periphery of the rotating body 11 is maintained at a substantially fixed level. In addition, if the obverse and reverse surfaces of the belt-like member fed through the guiding device are constantly parallel with the axis of rotation of the rotating body despite the fact that the radius of the rotating body changes in correspondence with the axial position, as mentioned above, there is a possibility that only one side of the belt-like member is pressure-fitted to the outer periphery of the rotating body, while the other side thereof floats from the outer periphery of the rotating body. In addition, there is a possibility that the wound belt-like member is offset in the direction of the axis of rotation of the rotating body. For this reason, in this aspect of the invention, a signal is transmitted from the control device to the rotating device on the basis of the information stored as described above, to operate the rotating device, thereby rotating the guiding device about a straight line which is substantially parallel with a tangent to the outer periphery of the rotating body at the winding position. Thus, in this aspect of the invention, as the three devices, including the moving device for moving the support base in the axial direction of the rotating body, the approaching device for moving the support base in parallel with a straight line perpendicular to the axis of rotation of the rotating body, and the rotating device for rotating the guiding device about the straight line substantially parallel with the tangent to the outer periphery of the rotating body, are only provided, it is possible to satisfactorily wind the belt-like member around the outer periphery of the rotating body. In addition, the structure can be made simple, and the apparatus can be manufactured at low cost.

In accordance with still another aspect of the invention, there is provided a method of feeding a belt-like member to a rotating member, comprising the steps of: holding a starting end of the belt-like member by a holding device from both obverse and reverse surface sides of the belt-like member in a holding position where the belt-like member is held; feeding the starting end of the belt-like member held by the holding device from the holding position to the rotating body; and pressure-fitting the starting end of the belt-like member supplied to the rotating body in the feeding step onto the rotating body.

In accordance with the above-described aspect of the invention, when the starting end of the belt-like member having a small width is fed to a rotating body and is pressure-fitted thereto, first, in the holding step, the starting end of the belt-like member located in the holding position is held from both obverse and reverse surface sides thereof by the holding device. Then, in the feeding step, as the holding device is moved forwardly by the feeding device, the starting end of the belt-like member is fed from the holding position to the rotating body. In this feeding step, since the starting end of the belt-like member is held on both obverse and reverse surface sides by a mechanical force by the holding device, the holding force can be made substantially large, as required. Accordingly, even if a large external force acts during feeding, the belt-like member is prevented from being offset or removed from the holding device. Hence, the starting end of the belt-like member can be fed to the rotating body reliably and with high accuracy. Then, in the pressure-fitting step, when the starting end of the belt-like member reaches the rotating body, the starting end of the belt-like member is pressure-fitted to the rotating body by the holding device.

The other objects, features and advantages of the present invention will become more apparent from the following detailed description of the invention when read in conjunction with the accompanying drawings.

DETAILED DESCRIPTION OF THE PREFERRED EMBODIMENTS

Referring now to the accompanying drawings, a description will be given of an embodiment of the present invention.

Figure 1:
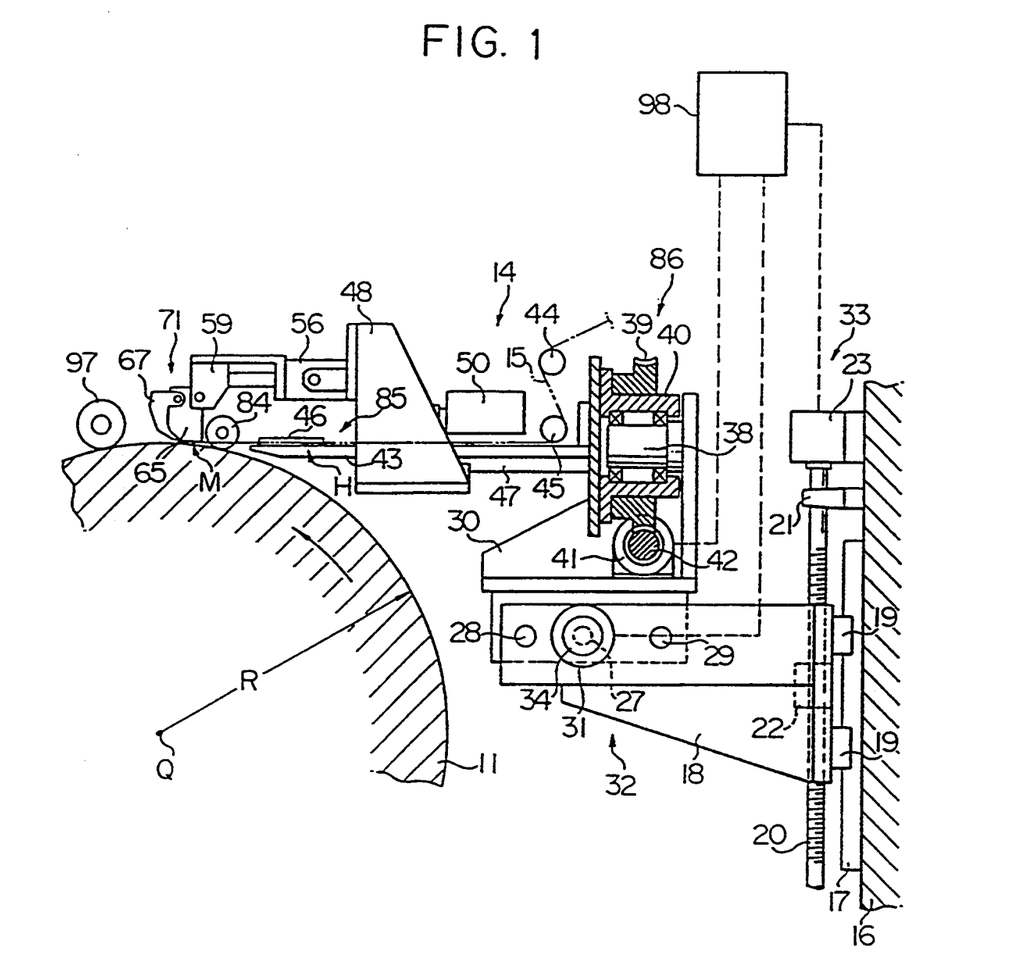
FIG. 1 is a partially cutaway cross-sectional view illustrating an embodiment of the present invention.
Figure 2:
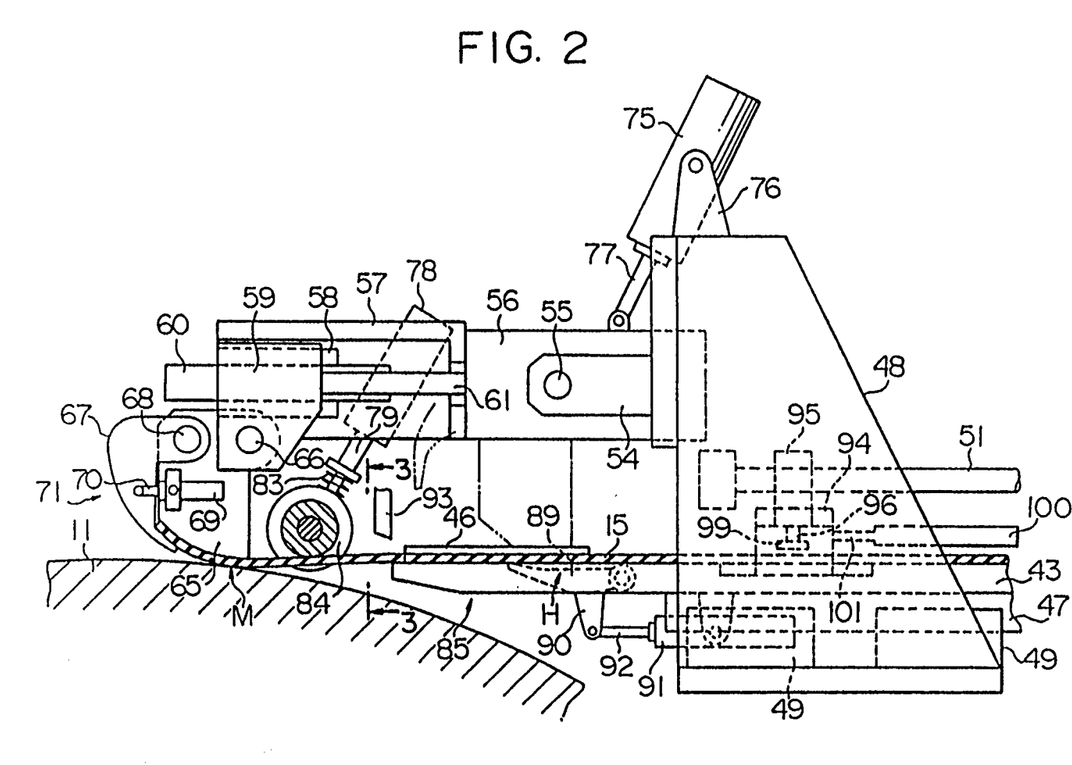
FIG. 2 is a side elevational view of a holding means and its vicinity.

Referring to FIGS. 1 and 2, a rotating body 11 is capable of rotating about a horizontal axis of rotation Q and is constituted by, for instance, an intermediate product of a tire fitted around a forming drum and expanded in a toroidal shape. Accordingly, the distance from the axis of rotation Q to an outer periphery of the rotating body 11, i.e., a radius R, changes in correspondence with an axial position. In this embodiment, the radius R becomes smaller from the axial center toward each axial end.

A winder 14 winds a belt-like member 15 having a small width helically around the outer periphery of the rotating body 11. The belt-like member 15 is, for instance, a belt-like strip in which a plurality of cords are coated with rubber. The winder 14 has a frame 16 disposed upstream of the belt-like member 15. A rail 17 is laid on a surface of the frame 16 opposing the rotating body 11, and the rail 17 extends in parallel with a vertical line perpendicular to the axis of rotation Q of the rotating body 11. Slide bearings 19 are secured to a lifting base 18 and are slidably supported by the rail 17. A lead screw 20 is rotatably supported by a bearing 21 disposed on the frame 16. The lead screw 20 extends in parallel with the vertical direction of the frame 16. This lead screw 20 is threadedly engaged with a screw block 22 secured on the lifting base 18. A motor 23 is mounted on the frame 16, and an output shaft of the motor 23 is coupled to the lead screw 20.

A lead screw 27 extends in parallel with the axis of rotation Q of the rotating body 11, and opposite ends of this lead screw 27 are rotatably supported by portions of the lifting base 18 located in the vicinity of the rotating body 11. In addition, opposite ends of guide rods 28, 29 which are parallel with the lead screw 27 are fixed to the lifting base 18 on both sides of the lead screw 27 that are respectively located close to and away from the rotating body 11. The lead screw 27 is screwed into a support base 30, and the guide rods 28, 29 are inserted slidably in the support base 30. A motor 31 is mounted on the lifting base 18, and an output shaft of the motor 31 is coupled to the aforementioned lead screw 27. The motor 31 is operated and the lead screw 27 rotates thus, the support base 30 moves in parallel with the axis of rotation Q of the rotating body 11 while being guided by the guide rods 28, 29. The lead screw 27 and the motor 31 as a whole constitute a moving means 32 for moving the support base 30 in parallel with the axis of rotation Q of the rotating body 11. In addition, as the motor 23 is operated and the lead screw 20 rotates, the support base 30 supported by the lifting base 18 moves in parallel with a straight line perpendicular to the axis of rotation Q of the rotating body 11, i.e., in a direction in which the support base 30 moves toward or away from the rotating body. The lead screw 20 and the motor 23 as a whole constitute an approaching means 33 for causing the support base 30 to move toward or away from the rotating body 11. An encoder 34 is attached to the motor 31, detects the present position of the support base 30 in the axial direction of the rotating body 11 by measuring an amount of rotation of the motor 31, i.e., an amount of rotation of the lead screw 27.

The support base 30 has a horizontal support shaft 38 extending toward the rotating body 11, and a worm wheel 39 is rotatably supported on an outer periphery of this support shaft 38 via a bearing 40. A servo motor 41 is mounted on the support base 30, and a worm 42 meshing with the worm wheel 39 is coupled to an output shaft of this servo motor 41. A rear end of a horizontal guide plate 43 extending to the vicinity of a top of the rotating body 11 is secured to the worm wheel 39. The belt-like member 15 fed via guide rollers 44, 45 passes over an upper surface of the guide plate 43 while being brought into sliding contact therewith, and is fed onto the rotating body 11. A pair of guide blocks 46 are disposed on an upper surface of the guide plate 43 at a distal end thereof to be spaced apart from each other in the transverse direction of the belt-like member 15. As the belt-like member 15 passes between the guide blocks 46, the widthwise position of the belt-like member 15 is determined.

In addition, a rail 47 extending in the longitudinal direction of the guide plate 43 is laid on the underside of the guide plate 43, and a slide bearing 49 fixed to a movable base 48 slidably engages with the rail 47. A cylinder 50, serving as a driving means, is attached to the guide plate 43, and a distal end of a piston rod 51 of this cylinder 50 is coupled to the aforementioned movable base 48. As a result, as the piston rod 51 is extended or retracted upon actuation of the cylinder 50, the movable base 48 is moved toward or away from the rotating body 11 while being guided by the rail 47.

A cylinder 56 serving as a substantially horizontal driving mechanism is mounted via a pin 55 in brackets 54 secured to the movable base 48. A slide bearing 58 is mounted in a support 57 secured to a distal end of this cylinder 56. A moving block 59 is provided with a rail 60 slidably engaging with the slide bearing 58, and the rail 60 is disposed in parallel with the guide plate 43. A distal end of a piston rod 61 of the cylinder 56 is coupled to the moving block 59. As a result, as the piston rod 61 is extended or retracted upon actuation of the cylinder 56, the moving block 59 moves in the longitudinal direction. A holding block 65 has an upper end rotatably supported on a lower front end portion of the moving block 59 via a pin 66 which is parallel with the axis of rotation Q of the rotating body 11. This holding block 65 is capable of swinging about the pin 66 in the feeding direction of the belt-like member 15. A lower portion of the holding block 65 is formed arcuately with the pin 66 as center. A holding pawl 67 is swingably supported at an upper front end portion of the holding block 65 via a pin 68 which is parallel with the pin 66. A lower end of this holding pawl 67 extends to a lower portion of the holding block 65. A cylinder 69 is fixed in the holding block 65, and a distal end of a piston rod 70 of this cylinder 69 is coupled to a central portion of the holding pawl 67. As a result, if the piston rod 70 is retracted upon actuation of the cylinder 69, the holding pawl 67 is swung in such a manner to approach the holding block 65 and is hence capable of holding the starting end of the belt-like member 15 between the same and the holding block 65. The above-described cylinder 56, moving block 59, holding block 65, and holding pawl 67 as a whole constitute a holding means 71 which is capable of holding the starting end of the belt-like member 15 from both the obverse and reverse surface sides thereof and of pressure-fitting the starting end of the belt-like member 15 onto the rotating body 11. The holding means 71 moves in the forward direction through the actuation of the cylinder 50, and supplies the starting end of the belt-like member 15 from a holding position H to the top of the rotating body 11. A cylinder 75 is mounted in brackets 76 secured to an upper end of the movable base 48, and a distal end of a piston rod 77 of this cylinder 75 is coupled to the cylinder 56. As a result, as the piston rod 77 is extended or retracted upon actuation of the cylinder 75, the holding means 71 swings about the pin 55. Consequently, the holding block 65 and the holding pawl 67 is retracted upwardly of the rotating body 11, or presses the starting end of the belt-like member 15, being held by the holding block 65 and the holding pawl 67, against the rotating body 11.

Figure 3:
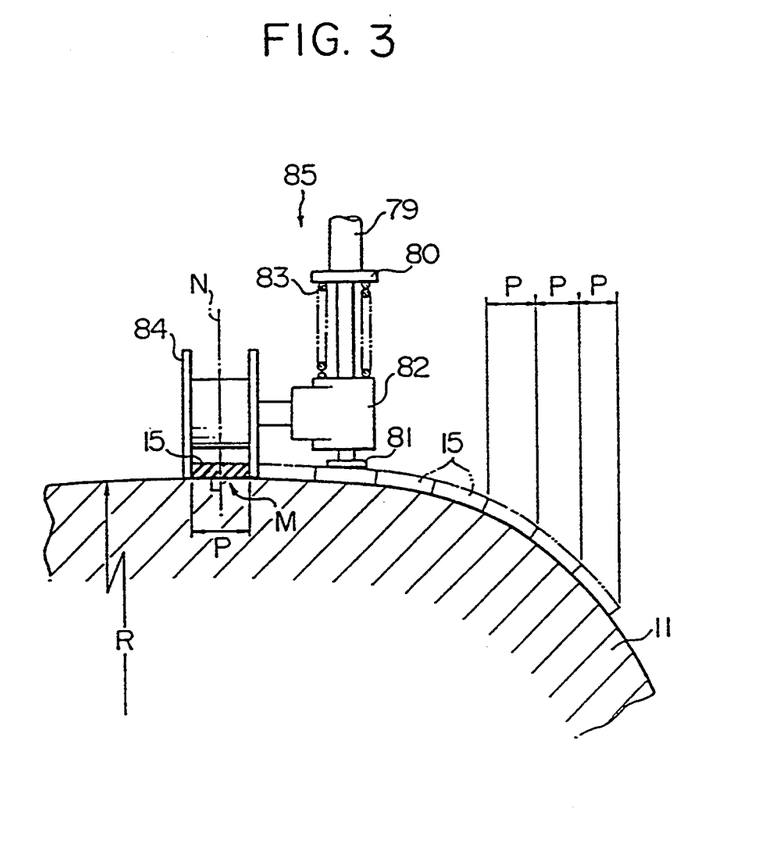
FIG. 3 is a view taken in the direction of arrow 3—3 in FIG. 2.

In FIGS. 1, 2 and 3, a cylinder 78 is mounted on the support 57. This cylinder 78 is provided with a piston rod 79, and a pair of collars 80, 81 are formed on a distal end portion of the piston rod 79 to be spaced apart from each other in the longitudinal direction of the piston rod 79. A slider 82 is slidably disposed on the piston rod 79 between the collars 80, 81, and a spring 83 is provided between the slider 82 and the upper collar 80. Supported by this slider 82 is a guide roller 84 with a pair of collars which rotates about its axis of rotation which is substantially parallel with the axis of rotation Q of the rotating body 11. The guide roller 84 presses a portion of the belt-like member 15 located upstream of the holding block 65 from above, thereby to guide the belt-like member 15. The above-described guide plate 43, guide block 46, and guide roller 84 as a whole constitute a guide 85 for guiding the belt-like member 15 which is fed to the rotating body 11. Through the operation of the motor 41, guide 85 rotates in parallel with a tangent to the outer periphery of the rotating body 11 at a winding position M at which the belt-like member 15 starts to be wound with respect to the rotating body 11, and about a straight line perpendicular to the direction of movement of the support base 30 due to the moving means 32. That is, guide 85 moves about the central axis of the support shaft 38 in this case, so as to cause the belt-like member 15 being guided to be tilted to the left or right. The above-described worm wheel 39, motor 41, and worm 42 as a whole constitute a rotating means 86 for rotating the guide 85 about the aforementioned straight line.

Referring again to FIGS. 1 and 2, a swinging member 89, is coupled to the guide plate 43 to be capable of swinging vertically about its rear end and, is disposed immediately below the holding position H. A cylinder 91 is supported by the guide plate 43 and has a piston rod 92. A distal end of the piston rod 92 is coupled to a bracket 90 provided on the swinging member 89. If this cylinder 91 is actuated and the piston rod 92 is extended, the swinging member 89 is swung upwardly about one end thereof to upwardly bend the starting end of the belt-like member 15, thereby making it possible to press the starting end of the belt-like member 15 against the arcuate lower portion of the holding block 65. A cutter 93 is disposed upwardly of a forward end of the guide plate 43 and is upwardly movable. This cutter 93, when lowered, is capable of cutting the belt-like member 15 in the transverse direction in cooperation with the forward end of the guide plate 43. A hollow slide block 94 is slidably supported on a portion of the guide plate 43 located upstream of the swinging member 89. The belt-like member 15 passes through this slide block 94. A cylinder 95 is fixed to the slide block 94 and extends vertically. A pressing plate 99 is secured to a distal end of a piston rod 96 provided in the cylinder 95. This cylinder 95 is actuated before the belt-like member 15 is cut by the cutter 93, and the cylinder 95 presses and fixes a portion of the belt-like member 15 located upstream of a cutting position against the slide block 94 by means of the pressing plate 99. A cylinder 100 is fixed to the guide plate 43, and a distal end of a piston rod 101 of cylinder 100 is coupled to the slide block 94. Since the piston rod 101 is extended or retracted upon actuation of the cylinder 100, the slide block 94 is moved in the longitudinal direction of the belt-like member 15. A pressure-fitting roller 97 is disposed immediately above a portion of the rotating body 11 located downstream of the winding position M. When the belt-like member 15 is wound around the rotating body 11, pressure-fitting roller 97 is lowered to press and pressure-fit the belt-like member 15 against the rotating body 11.

A control means 98 is connected to the motors 23, 31, 41 and the encoder 34. The control means 98 is, for instance, a microcomputer. By controlling the motors 31, 23 respectively constituting the moving means 32 and the approaching means 33, the control means 98 changes the positions of the support base 30 and the guide 85 by following the outer profile of the rotating body 11. In addition, by controlling the motor 41 of the rotating means 86, the control means 98 causes the belt-like member 15 to be tilted to the left or right such that the obverse and reverse surfaces of the belt-like member 15 at the winding position M become perpendicular to the normal line N (see FIG. 3) to the rotating body 11 at the winding position M.

Next, a description will be given of the operation of a preferred embodiment of the present invention.

Figure 4:
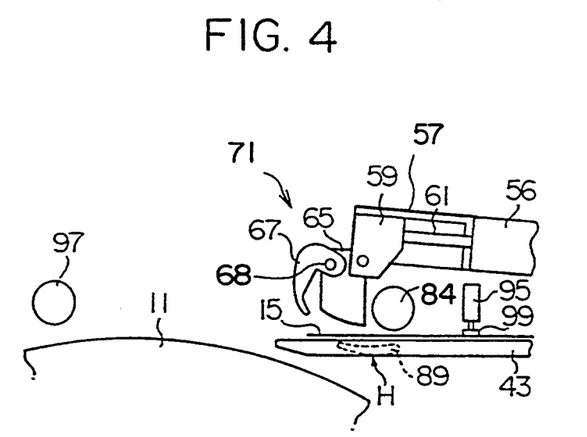
FIG. 4 is an explanatory diagram illustrating the operation in accordance with the present invention.
Figure 5:
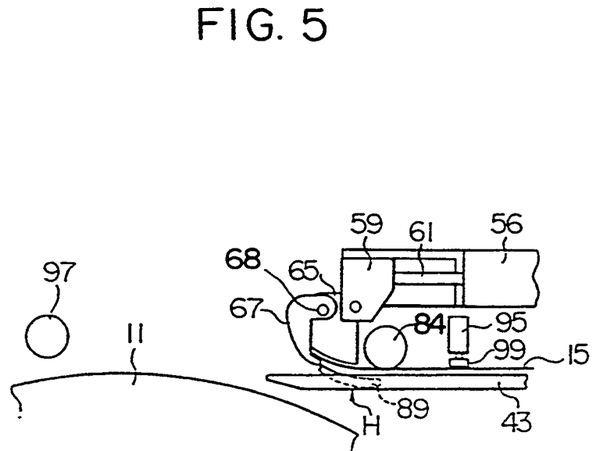
FIG. 5 is an explanatory diagram illustrating the operation in accordance with the present invention.

It is assumed that, as shown in FIGS. 1, 4, and 5, the starting end of the belt-like member 15 is located at the holding position H, and that the holding means 71 is waiting immediately above the holding position H. At this juncture, since the piston rod 77 of the cylinder 75 is in an extended state, the cylinder 56, the support 57, and the holding means 71 are located above the belt-like member 15 with the pin 55 as a center. Next, the cylinder 75 is actuated to cause the piston rod 77 to be retracted, thereby causing the cylinder 56, the support 57, and the holding means 71 to be swung downwardly with the pin 55 as a center. As a result, the holding block 65 of the holding means 71 is pressed against the starting end of the belt-like member 15 from above. Next, the piston rod 92 of the cylinder 91 is extended to cause the swinging member 89 to be swung upwardly. Hence, the starting end of the belt-like member 15 located at the holding position H is bent upwardly by the swinging member 89, and is pressed against the arcuate front lower end of the holding block 65. Next, as the piston rod 70 of the cylinder 69 is retracted, the holding pawl 67 is swung in such a manner as to approach the holding block 65 with the pin 68 as a center. Consequently, the starting end of the belt-like member 15 which is pressed against the holding block 65 is held from both obverse and reverse surface sides thereof by the holding pawl 67 and the holding block 65 at the holding position H. This state is shown in FIG. 5.

Figure 6:
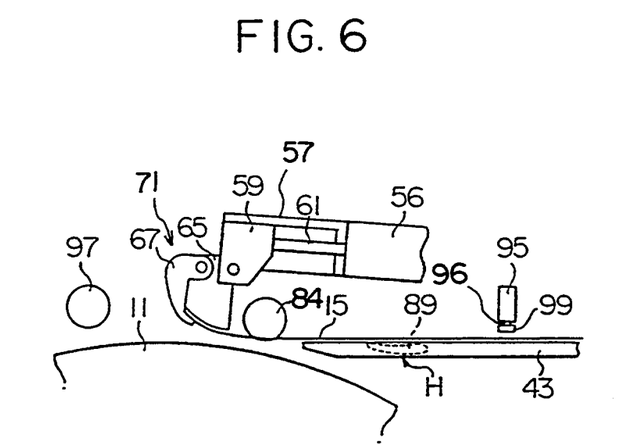
FIG. 6 is an explanatory diagram illustrating the operation in accordance with the present invention.

Next, as shown in FIGS. 2 and 6, the piston rod 92 of the cylinder 91 is retracted, which in turn causes the swinging member 89 to be swung downwardly and is returned to its initial position at which it is retracted from the upper surface of the guide plate 43. Then, the piston rod 77 of the cylinder 75 is extended, which in turn causes the cylinder 56, the support 57, and the grip means 71 to be swung upwardly with the pin 55 as a center, so that the starting end of the belt-like member 15 is slightly held upwardly by the holding means 71. At this time, the portion of the belt-like member 15 located immediately behind the holding means 71 is guided by the guide roller 84. Then, the piston rod 96 of the cylinder 95 is retracted to raise the pressing plate 99, and the belt-like member 19 is released from the pressing and fixing by the pressing plate 99. At this time, the cylinder 100 is actuated to extend the piston rod 101, thereby causing the slide block 94 and the cylinder 95 to move forward. Then, the piston rod 51 of the cylinder 50 is extended, so that the movable base 48, the cylinder 56, the support 57, and the holding means 71 holding the starting end of the belt-like member 15 are moved as a unit in the downward direction of the belt-like member 15 and approach the rotating body 11. This approaching motion is stopped when the holding means 71 reaches a point immediately above the top of the rotating body 11. As a result, the starting end of the belt-like member 15 is moved from the holding position H to the top of the rotating body 11. At that time, although the starting end of the belt-like member 15 is held from both obverse and reverse surface sides thereof by the holding means 71, such a holding force is a mechanical force, so that it can be made large, as required. Consequently, even if a large external force or the like acts on the belt-like member 15 during feeding, the belt-like member 15 is prevented from being removed or offset from the holding means 71. Thus, the starting end of the belt-like member 15 can be fed to the rotating body 11 reliably and with high accuracy. The condition at that time is shown in FIG. 6.

Figure 7:
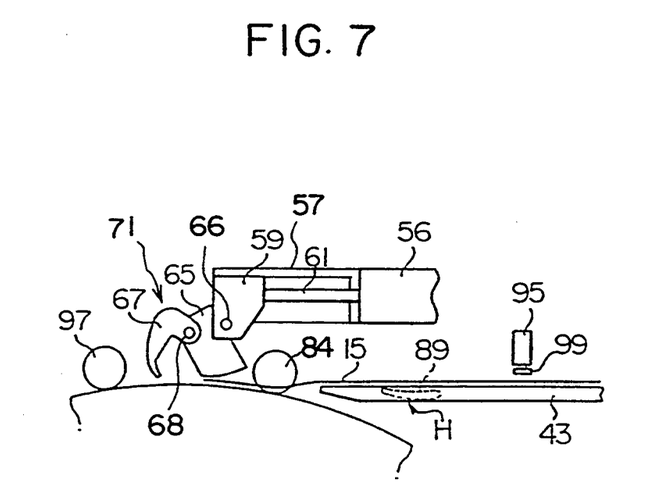
FIG. 7 is an explanatory diagram illustrating the operation in accordance with the present invention.

Subsequently, as shown in FIGS. 2 and 7, the cylinder 75 is actuated to retract the piston rod 77, and the cylinder 56, the support 57, and the holding means 71 are thereby swung downwardly with the pin 55 as a center. As a result, the holding block 65 is pressed against the rotating body 11, and the starting end of the belt-like member 15 which was held by the holding block 65 and the holding pawl 67 is pressure-fit onto the top of the rotating body 11. At this moment, the piston rod 79 of the cylinder 78 is extended, so that the guide roller 84 which is guiding the belt-like member 15 is moved toward the outer periphery of the rotating body 11. Then, the piston rod 70 of the cylinder 69 is extended, thereby allowing the holding pawl 67 to be swung about the pin 68 in such a manner as to move away from the holding block 65. As a result, the starting end of the belt-like member 15 is released from the holding by the holding block 65 and the holding pawl 67. Then, the piston rod 61 of the cylinder 56 is extended to move the moving block 59 in the downward direction. At that time, since the lower end of the holding block 65 is pressed against the outer periphery of the rotating body 11 via the belt-like member 15, the holding block 65 is unable to slip on the belt-like member 15 and is swung in the downstream direction about the pin 66 located at the upper end thereof. Here, since the lower end portion of the holding block 65 is formed arcuately with the pin 66 as a center, the starting end of the belt-like member 15 is pressed against and pressure-fit onto the rotating body 11 by the lower end portion of this holding block 65. Consequently, the portion of the belt-like member 15 which was not pressed against the rotating body 11 by being held by the holding pawl 67 is pressure-fit reliably and with high accuracy by the holding block 65 having a simple arrangement. At this moment, the pressure-fitting roller 97 approaches the rotating body 11 and is brought into contact with the outer periphery of the rotating body 11. This state is shown in FIG. 7.

Figure 8:
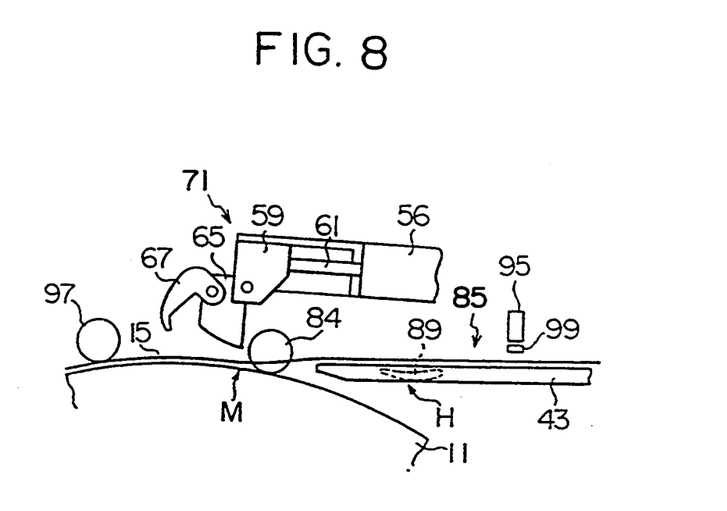
FIG. 8 is an explanatory diagram illustrating the operation in accordance with the present invention.

Subsequently, as shown in FIGS. 1, 2 and 8, the piston rod 77 of the cylinder 75 is extended, so that the cylinder 56, the support 57, and the holding means 71 are swung upwardly about the pin 55, thereby causing the holding block 65 to retract upwardly. Then, the piston rod 61 of the cylinder 56 is retracted to cause the moving block 59 and the holding means 71 to move in the upstream direction by the same distance as the aforementioned distance. The rotating body 11 is then rotated, and the belt-like member 15 guided by the guide roller 84 is fed to the rotating body 11. Concurrently, the motor 31 of the moving means 32 is operated by the control means 98 to rotate the lead screw 27. This in turn causes the support base 30 and the guide 85 to move axially outwardly in parallel with the axis of rotation Q of the rotating body 11. Hence, the belt-like member 15 is wound helically around the outer periphery of the rotating body 11, and is pressure-fitted onto it by means of the pressure-fitting roller 97. Here, the radius R of the rotating body 11 changes in correspondence with the axial position thereof. Since the radius R becomes smaller toward the outer side in the axial direction, if the support base 30 and the guide 85 are merely moved in parallel with the axis of rotation Q of the rotating body 11, the guide 85 would become gradually separated from the outer periphery of the rotating body 11. For this reason, in this embodiment, the motor 23 of the approaching means 33 is operated by the control means 98 to rotate the lead screw 20. This causes the support base 30 and the guide 85 to move in parallel with a straight line perpendicular to the axis of rotation Q of the rotating body 11, and downwardly along the perpendicular line in this case, thereby allowing the support base 30 and the guide 85 to approach the rotating body 11. The movement of the support base 30 and the guide 85 by the approaching means 33 is controlled on the basis of information concerning the outer profile of the rotating body 11 stored in advance in the control means 98 and on information concerning present axial positions of the support base 30 and the guide 85 which are inputted from the encoder 34. As a result, the relative position of the guide 85 vis-a-vis the outer periphery of the rotating body 11 is maintained at a substantially fixed level. In addition, if the obverse and reverse surfaces of the belt-like member 15 fed through the guide 85 are constantly parallel with the axis of rotation Q of the rotating body 11, despite the fact that the radius R of the rotating body 11 changes in correspondence with the axial position, as mentioned above, there is a possibility that only one side (an inward side in the axial direction of the rotating body 11) of the belt-like member 15 is pressure-fitted to the outer periphery of the rotating body 11, while the other side (an outward side in the axial direction of the rotating body 11) thereof floats from the outer periphery of the rotating body 11. In addition, there is a possibility that the wound belt-like member 15 is offset toward the axially outward side of the rotating body 11. For this reason, in this embodiment, as shown in FIG. 3, a signal is transmitted from the control means 98 to the motor 41 of the rotating means 86 on the basis of the stored information and the positional information from the encoder 34, as described above, to operate the motor 41, thereby rotating the guide 85 about a straight line which is substantially parallel with a tangent to the outer periphery of the rotating body 11 at the winding position M. Consequently, the obverse and reverse surfaces of the belt-like member 15 at the winding position M and the normal line N to the rotating body 11 at the winding position M intersect each other, with the result that the above-described situation can be obviated. Thus, in this embodiment, if the three means, including the moving means 32 for moving the support base 30 in the axial direction of the rotating body 11, the approaching means 33 for moving the support base 30 in parallel with a straight line perpendicular to the axis of rotation 0 of the rotating body 11, and the rotating means 86 for rotating the guide 85 about the straight line substantially parallel with the tangent to the outer periphery of the rotating body 11, are only provided, it is possible to satisfactorily wind the belt-like member 15 around the outer periphery of the rotating body 11. In addition, the structure can be made simple, and the apparatus can be manufactured at a low cost. Furthermore, if, as shown in FIG. 3, the belt-like member 15 is wound around the vicinity of the axially outer end of the rotating body 11, a rate of change of the radius R of the rotating body 11, i.e., a difference in the radius R between positions spaced apart a unit length in the direction of the axis of rotation of the rotating body 11, becomes large, so that an angle of inclination of the belt-like member 15 wound at that portion with respect to the axis of rotation Q becomes large. Consequently, if the distance of axial movement (i.e., pitch) of the support base 30 and the guide 85 per revolution of the rotating body 11 is fixed, a gap would be created between adjacent portions of the wound belt-like member 15. For this reason, in this embodiment, the movement in the direction of the axis of rotation of the support base 30 and the guide 85 is controlled by the control means 98 such that the pitch of movement P of the support base 30 per revolution of the rotating body 11 becomes small, thereby preventing the occurrence of the aforementioned gap.

Figure 9:
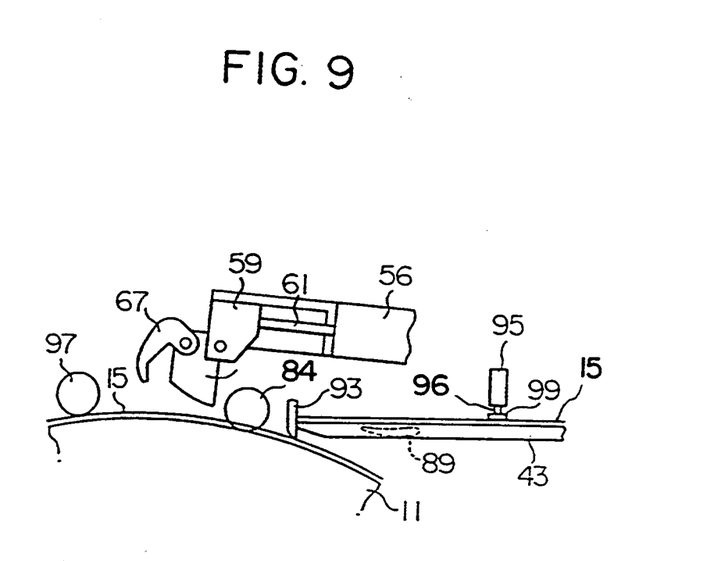
FIG. 9 is an explanatory diagram illustrating the operation in accordance with the present invention.

As shown in FIGS. 1, 2 and 9, when the belt-like member 15 is wound helically around the periphery of the rotating body 11 a predetermined number of times, the rotation of the rotating body 11 is stopped, and the operation of the motors 31, 23, 41 is stopped. Then, the cylinder 95 is actuated to extend the piston rod 96, thereby allowing the pressing plate 99 to press and fix the belt-like member 15 against the slide block 94. Subsequently, the cutter 93 is lowered and cuts the belt-like member 15 in the transverse direction at the cutting position in cooperation with the guide plate 43. At that time, since the portion of the belt-like member 15 located downstream of the cutting position is guided by the guide roller 84, and the portion of the belt-like member 15 located upstream of the cutting position is fixed by the pressing plate 99, the belt-like member 15 is prevented from moving or becoming deformed during cutting. After the belt-like member 15 is cut, the cutter 93 is raised to its initial position. Then, the rotating body 11 is rotated through a predetermined angle, and a terminating portion of the cut belt-like member 15 is pressure-fitted to the rotating body 11 by the pressure-fitting roller 97. Subsequently, the cylinder 78 is actuated to retract the piston rod 79 to raise the guide roller 84, and the cylinder 50 is actuated to retract the piston rod 51 so as to return the movable base 48 to its initial position. At this juncture, the cylinder 100 is actuated to retract the piston rod 101 so as to move the slide block 94, the pressing plate 99, and the belt-like member 15 as a unit to the upstream side of the belt-like member 15, thereby returning the starting end of the belt-like member 15 to the holding position H. The pressure-fitting roller 97 is then raised and is removed from the rotating body 11. Subsequently, tread rubber is attached to the periphery of the rotating body 11 and a green tire is thereby formed. This green tire is discharged from the forming drum, and a new tire intermediate product is loaded on the forming drum. The above-described operation constitutes one cycle in the operation of this embodiment, and this cycle is repeated thereafter.

What is claimed is:

1. An apparatus for winding a small width member for feeding a starting end thereof to a rotating body and for pressure-fitting the same onto the rotating body, said apparatus comprising:

holding means for holding the starting end of the small width member from both obverse and reverse surface sides thereof and for pressure-fitting the starting end of the small width member onto the rotating body; and feeding means for feeding the starting end of the small width member to the rotating body by moving the starting end thereof from a holding position where the small width member is held to the rotating body as said holding means is moved, said holding means including a holding member for holding the small width member, a holding-member moving member, said holding member swung as said holding-member moving member moves in a direction of a tangent to the rotating body parallel with an equatorial plane of the rotating body, to pressure-fit the starting end of the small width member onto the rotating body, wherein the rotating body is rotatable about an axis of rotation, and a radius of the rotating body from the axis of rotation to an outer periphery thereof changes in correspondence with an axial position, and said feeding means includes moving means for moving said holding means in parallel with the direction of the tangent to the rotating body.

2. An apparatus for winding a small width member according to claim 1, wherein said holding-member moving member includes a moving block for pivotally supporting said holding member to render said holding member swingable and, a driving mechanism for moving said moving block in a longitudinal direction of the rotating body.

3. An apparatus for winding a small width member according to claim 2, wherein said holding member includes a holding block coupled to said moving block to be swingable in a feeding direction of the small width member and a holding claw disposed on said holding block to be swingable and adapted to hold the starting end of the small width member between said holding claw and said holding block when said holding claw is swung to approach said holding block.

4. An apparatus for winding a small width member according to claim 1, wherein said feeding means includes approaching means for moving said holding means toward or away from the rotating body by moving said holding means in parallel with a straight line perpendicular to the axis of rotation of the rotating body.

5. An apparatus for winding a small width member according to claim 4, wherein said feeding means includes guiding means for guiding the small width member to be supplied to the rotating body.

6. An apparatus for winding a small width member according to claim 5, wherein said guiding means includes a swinging member disposed near the starting end of the small width member at the holding position thereof, said swinging member adapted to allow the starting end of the small width member, with a holding block and a holding pawl disposed on said holding member, by bending the starting end of the small width member as said swinging member is swung about one end thereof.

7. An apparatus for winding a small width member according to claim 5, wherein said feeding means includes rotating means for rotating said holding means and said guiding means about a straight line which is substantially parallel with the tangent to the outer periphery of the rotating body.

8. An apparatus for winding a small width member according to claim 7, wherein said feeding means includes said supporting means coupled to said moving means said approaching means and for supporting said guiding means via said rotating means.

9. An apparatus for winding a small width member according to claim 8, wherein said feeding means includes control means adapted to change positions of said holding means and said guiding means by following an outer profile of the rotating body by controlling said moving means and said approaching means, whereby the obverse and reverse surfaces of the small width member at a winding position are oriented perpendicular to a normal line to the outer periphery of the rotating body at the winding position by controlling said rotating means.

10. An apparatus for winding a small width member according to claim 9, wherein said control means reduces a pitch of movement of said moving means as a rate of change of the radius of the rotating body becomes larger.

11. An apparatus for helically winding a small width member around an outer periphery of a rotating body which is rotatable about an axis of rotation and whose radius from the axis of rotation to the outer periphery thereof changes in correspondence with an axial position, said apparatus comprising:
guiding means for guiding the small width member supplied to the rotating body;
moving means for moving said guiding means in parallel with an axial direction of the rotating body;
approaching means for moving said guiding means toward or away from the rotating body by moving the guiding means in parallel with a straight line perpendicular to the axis of rotation of the rotating body;
rotating means for rotating said guiding means about a straight line substantially parallel with a tangent to the outer periphery of the rotating body; and
control means adapted to change a position of said guiding means by following an outer profile of the rotating body by controlling said moving means and said approaching means, and positioning obverse and reverse surfaces of the small width member at a winding position perpendicular to a normal line to the outer periphery of the rotating body at the winding position by controlling said rotating means.

12. An apparatus for winding a small width member according to claim 11, wherein said control means reduces a pitch of movement of said moving means as a rate of change of a radius of the rotating body becomes larger.

13. An apparatus for winding a small width member according to claim 12, further comprising:
supporting means coupled to said moving means and said approaching means and adapted to support said guiding means via said rotating means.

14. An apparatus for winding a small width member according to claim 13, wherein said approaching means includes a lead screw member for moving said supporting means by being axially rotated by a driving source attached to one end of said lead screw member.

15. An apparatus for winding a small width member according to claim 13, wherein said moving means includes a lead screw member for moving said supporting means by being axially rotated by a driving source attached to one end of said lead screw member.

16. An apparatus for winding a small width member according to claim 15, wherein said moving means includes an encoder for measuring an amount of rotation of said lead screw member to detect a position of said supporting means.

17. An apparatus for winding a small width member according to claim 13, wherein said rotating means includes a worm gear member for rotating said guiding means by being axially rotated by a driving source provided on said worm gear member.

18. An apparatus for winding a small width member according to claim 17, wherein said guiding means comprises a guide rail positioned relative to an axis of rotation of a worm wheel positioned on said worm gear member, said guide rail being oriented parallel with an axial direction of said worm wheel in its longitudinal direction.

* * * * *